US009393529B2

(12) United States Patent
Zhou

(10) Patent No.: US 9,393,529 B2
(45) Date of Patent: Jul. 19, 2016

(54) METHOD OF FORMING A HYDROPHILIC MEMBRANE

(75) Inventor: Jinsheng Zhou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 26 days.

(21) Appl. No.: 12/992,916

(22) PCT Filed: May 19, 2009

(86) PCT No.: PCT/US2009/044459
§ 371 (c)(1),
(2), (4) Date: Nov. 16, 2010

(87) PCT Pub. No.: WO2010/002512
PCT Pub. Date: Jan. 7, 2010

(65) Prior Publication Data
US 2011/0092606 A1    Apr. 21, 2011

Related U.S. Application Data

(60) Provisional application No. 61/076,792, filed on Jun. 30, 2008.

(51) Int. Cl.
| B05D 5/00 | (2006.01) |
| C08L 23/12 | (2006.01) |
| B01D 67/00 | (2006.01) |
| B01D 69/10 | (2006.01) |
| B01D 71/38 | (2006.01) |
| B01D 71/76 | (2006.01) |
| B01D 71/26 | (2006.01) |

(52) U.S. Cl.
CPC ............ *B01D 67/0011* (2013.01); *B01D 69/10* (2013.01); *B01D 71/38* (2013.01); *B01D 71/76* (2013.01); *B01D 71/26* (2013.01); *B01D 2325/36* (2013.01)

(58) Field of Classification Search
CPC .... B01D 67/0011; B01D 69/10; B01D 71/38; B01D 71/76; B01D 2325/36; B01D 71/26
USPC ..................... 521/53, 54, 55, 141, 142, 143; 210/500.36, 500.42; 429/247, 249, 250
See application file for complete search history.

(56) References Cited

U.S. PATENT DOCUMENTS

| 1,529,256 A | 3/1925 | Kelley |
| 3,944,485 A | 3/1976 | Rembaum |
| 4,157,418 A | 6/1979 | Heilmann |
| 4,379,201 A | 4/1983 | Heilmann |
| 4,539,256 A | 9/1985 | Shipman |
| 4,726,989 A | 2/1988 | Mrozinski |
| 4,867,881 A | 9/1989 | Kinzer |
| 4,957,620 A | 9/1990 | Cussler |
| 5,049,275 A | 9/1991 | Gillberg-LaForce |
| 5,084,173 A | 1/1992 | Nitadori |
| 5,120,594 A | 6/1992 | Mrozinski |
| 5,260,360 A | 11/1993 | Mrozinski |
| 5,294,338 A | 3/1994 | Kamo |
| 5,468,390 A | 11/1995 | Crivello |
| 5,547,756 A | 8/1996 | Kamo |
| 5,891,530 A | 4/1999 | Wright |
| 5,962,544 A | 10/1999 | Waller, Jr. |
| 6,258,276 B1 | 7/2001 | Mika |
| 6,287,730 B1 | 9/2001 | Callahan |
| 6,451,386 B1 | 9/2002 | Simonetti |
| 6,793,820 B1 | 9/2004 | McCray |
| 7,247,370 B2 | 7/2007 | Childs |
| 2002/0148774 A1 | 10/2002 | Wang |
| 2003/0225439 A1 | 12/2003 | Cook |
| 2004/0185242 A1 | 9/2004 | Charkoudian |
| 2005/0058821 A1 | 3/2005 | Smith |
| 2005/0218069 A1 | 10/2005 | Lee |
| 2006/0000778 A1 | 1/2006 | Childs |
| 2007/0196151 A1 | 8/2007 | Ferrar |

FOREIGN PATENT DOCUMENTS

| EP | 0 203 459 | 12/1986 |
| EP | 0 481 517 | 10/1991 |
| EP | 1 464 380 | 10/2004 |
| EP | 1 574 249 | 9/2005 |
| JP | 04-126798 | 4/1992 |
| JP | 04-346825 | 12/1992 |
| JP | 08-311771 | 11/1996 |
| JP | 2003 301069 | 10/2003 |
| SU | 1 808 952 | 4/1993 |
| WO | WO 2006/015495 | 2/2006 |
| WO | WO 2006/034575 | 4/2006 |
| WO | WO 2007/127848 | 11/2007 |

OTHER PUBLICATIONS

Dai, et al., "Hollow Fiber-Supported Hydrogels with Mesh Size Asymmetry" *Journal of Membrane Science*, vol. 171, pp. 79-86 (2000).
Li, et al., "Characterization and Mechanical Support of Asymmetric Hydorgel Membranes Based on the Interfacial Cross-Linking of Poly(Vinyl Alcohol) With Toluene Diisocyanate" *Journal of Membrane Science*, vol. 111, pp. 115-122 (1996).
Wente, V.A., "Manufacture of Super Fine Organic Fibers"; *Naval Research Laboratories* (Report No. 4364) (May 25, 1954).
Wente, V.A., "Superfine Thermoplastic Fibers"; *Industrial Engineering Chemistry*, vol. 48, pp. 1342-1346 (1956).

*Primary Examiner* — Irina S Zemel
(74) *Attorney, Agent, or Firm* — Adrian L. Pishko

(57) ABSTRACT

The present disclosure provides methods for forming hydrophilic membranes. More specifically, methods are provided for hydrophilic membranes from a solution comprising an ethylene-vinyl alcohol copolymer, water, and a first solvent. At least a portion of the first solvent is removed from the porous substrate at a temperature no greater than 500 C. for forming a hydrophilic membrane.

18 Claims, No Drawings

METHOD OF FORMING A HYDROPHILIC MEMBRANE

FIELD

The present disclosure relates to a method of forming a hydrophilic membrane.

BACKGROUND

Membranes can be used in separation processes where certain species are retained and other species are allowed to pass through the membrane. Some membrane applications include, for example, use in food and beverage, pharmaceutical, medical, automotive, electronic, chemical, biotechnology, and dairy industries.

Membranes having hydrophilic surfaces have been described. Hydrophilic membranes generally have a tendency for less fouling or pore clogging than hydrophobic membranes. Some membranes prepared from hydrophobic materials require a surface pretreatment step before using for filtration of aqueous feed solutions. In other instances, some hydrophilic membranes have been formed from hydrophilic materials lacking mechanical strength.

SUMMARY

The present disclosure provides methods for forming hydrophilic membranes. More specifically, methods are provided for hydrophilic membranes from a solution comprising an ethylene-vinyl alcohol copolymer, water, and a first solvent. At least a portion of the first solvent is removed from the porous substrate at a temperature no greater than 50° C. for forming a hydrophilic membrane.

In one aspect, a method of forming hydrophilic membrane is provided. The method includes providing a porous substrate. The method includes applying a solution to the porous substrate. The solution comprises an ethylene-vinyl alcohol copolymer, water, and a first solvent. The first solvent is miscible with water, and has a boiling point less than water. The method includes removing at least a portion of the first solvent from the porous substrate at a temperature no greater than 50° C. to provide the hydrophilic membrane.

DETAILED DESCRIPTION

The recitation of numerical ranges by endpoints includes all numbers subsumed within that range (e.g., 1 to 5 includes 1, 1.5, 2, 2.75, 3, 3.8, 4, and 5).

As included in this specification and the appended claims, the singular forms "a", "an", and "the" include plural referents unless the content clearly dictates otherwise. Thus, for example, reference to a composition containing "a compound" includes a mixture of two or more compounds. As used in this specification and appended claims, the term "or" is generally employed in its sense including "and/or" unless the content clearly dictates otherwise.

Unless otherwise indicated, all numbers expressing quantities or ingredients, measurement of properties and so forth used in the specification and claims are to be understood as being modified in all instances by the term "about." Accordingly, unless indicated to the contrary, the numerical parameters set forth herein are approximations that can vary depending upon the desired properties sought to be obtained by those skilled in the art utilizing the teachings of the present disclosure.

Hydrophilic membranes formed by the method of the present disclosure comprise applying a solution to a porous substrate, and removing at least a portion of a first solvent from the porous substrate at a temperature no greater than 50° C. The solution comprises water, a first solvent, and an ethylene-vinyl alcohol copolymer. The surface energy of the porous substrate can be increased by the process described herein for forming a hydrophilic membrane. Hydrophilic membranes formed from the porous substrate can be made, for example, without the evaporation of high boiling solvents, without using precipitation techniques. Hydrophilic membranes as described can be stored and packaged dry without a preservative or a liquid to keep the membrane hydrated. Storage of a dry hydrophilic membrane can reduce the costs associated with packaging and storage of liquid containing membranes.

A solution comprising water, a first solvent, and an ethylene-vinyl alcohol copolymer can be applied to hydrophilic or hydrophobic porous substrates. The solution as applied to the porous substrate can coat the surfaces and the pores of the substrate. The hydrophilic membrane can be formed without reducing pore sizes or plugging of the pores with the ethylene-vinyl alcohol copolymer. The term "hydrophilic" refers to "having a strong affinity for water."

In the method of the present disclosure, the porous substrate can be selected from a variety of materials so long as the substrate is coatable or can be adapted to be coatable, and has openings or pores. Suitable porous substrates include, for example, films, porous membranes, woven webs, nonwoven webs, hollow fibers, and the like. Examples of films can include, for example, flat sheet material, tubular shaped material, and the like. The porous substrate may be formed from any polymeric material. Some suitable polymeric materials include, for example, polyolefins, poly(isoprenes), poly(butadienes), fluorinated polymers, chlorinated polymers, polyesters, polyamides, polyimides, polyethers, poly(ether sulfones), poly(sulfones), polyphenylene oxides, polyphenylene sulfides, poly(vinyl acetates), copolymers of vinyl acetate, poly (phosphazenes), poly(vinyl esters), poly(vinyl ethers), poly(vinyl alcohols), poly(carbonates) and the like, or combinations thereof. Suitable polyolefins include, for example, poly(ethylene), poly(propylene), poly(1-butene), copolymers of ethylene and propylene, alpha olefin copolymers (such as copolymers of 1-butene, 1-hexene, 1-octene, and 1-decene), poly(ethylene-co-1-butene), poly(ethylene-co-1-butene-co-1-hexene), and the like, or combinations thereof. Suitable fluorinated polymers include, for example, poly(vinyl fluoride), poly(vinylidene fluoride), copolymers of vinylidene fluoride (such as poly(vinylidene fluoride-co-hexafluoropropylene)), copolymers of chlorotrifluoroethylene (such as poly(ethylene-co-chlorotrifluoroethylene)), and the like, or combinations thereof. Suitable polyamides include, for example, poly(imino(1-oxohexamethylene)), poly(iminoadipoylimino hexamethylene) (i.e., nylon 6,6), poly(iminoadipoyliminodecamethylene(i.e., nylon 6,12), polycaprolactam, and the like, or combinations thereof. Suitable polyimides include, for example, poly(pyromellitimide), and the like. Suitable poly(ether sulfone)s include, for example, poly(diphenylether sulfone), poly(diphenylsulfone-co-diphenylene oxide sulfone), and the like, or combinations thereof.

In some embodiments, the porous substrate can have an average pore size less than about 10 micrometers. In other embodiments, the average pore size of the porous substrate can be less than about 5 micrometers, less than about 2 micrometers, or less than about 1 micrometer. In some embodiments, the average pore size of the porous substrate can be greater than about 10 nanometers. In other embodiments, the average pore size of the porous substrate is greater than about 50 nanometers, greater than about 100 nanometers, or greater than about 200 nanometers. In some embodiments, the porous substrate can have an average pore size in a range of about 10 nanometers to about 10 micrometers, in a range of about 50 nanometers to about 5 micrometers, in a range of about 100 nanometers to about 2 micrometers, or in a range of about 200 nanometers to about 1 micrometer.

Some suitable porous substrates include, for example, nanoporous membranes, microporous membranes, microporous nonwoven webs, microporous woven webs, microporous fibers, and the like. In some embodiments, the porous substrate can have a combination of different pore sizes (e.g., micropores and nanopores). In one embodiment, the porous substrate is microporous.

The thickness of the porous substrate can depend on the intended application of the membrane. Generally, the thickness of the porous substrate can be in a range of about 1 micrometer to about 500 micrometers. In some embodiments, the thickness of the porous substrate can be in a range of about 10 micrometers to about 400 micrometers, in a range of about 25 micrometers to about 300 micrometers, or in a range of about 35 micrometers to about 200 micrometers.

In some embodiments, the porous substrate comprises a microporous, thermally-induced phase separation (TIPS) membrane. TIPS membranes can be prepared by forming a solution of a thermoplastic material and a second material above the melting point of the thermoplastic material. Upon cooling, the thermoplastic material crystallizes and phase separates from the second material. The crystallized material can be stretched. The second material can be optionally removed either before or after stretching. TIPS membranes are disclosed in U.S. Pat. Nos. 1,529,256 (Kelley); 4,539,256 (Shipman); 4,726,989 (Mrozinski); 4,867,881 (Kinzer); 5,120,594 (Mrozinski); 5,260,360 (Mrozinski); and 5,962,544 (Waller, Jr.). In some embodiments, TIPS membranes comprise polymeric materials such as poly(vinylidene fluoride) (i.e., PVDF), polyolefins such as poly(ethylene) or poly(propylene), vinyl-containing polymers or copolymers such as ethylene-vinyl alcohol copolymers and butadiene-containing polymers or copolymers, and acrylate-containing polymers or copolymers. TIPS membranes comprising PVDF are further described in U.S. Patent Application Publication No. 2005/0058821 (Smith et al.)

In some embodiments, the porous substrate can be a nonwoven web having an average pore size that is typically greater than 25 micrometers. Suitable nonwoven webs include, for example, the melt-blown microfiber nonwoven webs described in Wente, V. A., "Superfine Thermoplastic Fibers"; *Industrial Engineering Chemistry,* 48, 1342-1346 (1956), and Wente, V. A., "Manufacture of Super Fine Organic Fibers"; *Naval Research Laboratories* (Report No. 4364) May 25, 1954. In some embodiments, suitable nonwoven webs can be prepared from nylon.

Some examples of suitable porous substrates include commercially available materials such as hydrophilic and hydrophobic microporous membranes known under the trade designations DURAPORE and MILLIPORE EXPRESS MEMBRANE, available from Millipore Corporation of Billerica, Mass. Other suitable commercial microporous membranes known under the trade designations NYLAFLO and SUPOR are available from Pall Corporation of East Hills, N.Y.

In the method of the present disclosure, a solution is applied to the porous substrate. The solution can be used to coat, soak, or immerse the porous substrate. Some useful porous substrates have been described above. Methods for applying or delivering the solution to the substrate include, for example, saturation or immersion techniques, spray coating, curtain coating, slide coating, flood coating, die coating, roll coating, deposition, or by other known coating or application methods. The applied solution can have a sufficient viscosity to effectively coat or penetrate the pores and surfaces of the porous substrate. In some embodiments, the viscosity of the solution is sufficient to coat the pores of the substrate.

In the method of the present disclosure, a solution comprises an ethylene-vinyl alcohol copolymer, water, and a first solvent. The ethylene-vinyl alcohol copolymer can be dissolved in the first solvent of the solution. The first solvent is miscible with water. In some embodiments, the solution can be heated to dissolve the ethylene-vinyl alcohol copolymer. The solution comprising the ethylene-vinyl alcohol copolymer can be applied to the porous substrate. The copolymer can coat the pores and surfaces of the porous substrate. At least a portion of the first solvent can be removed from the porous substrate at 50° C.

Ethylene-vinyl alcohol copolymers are generally formed from ethylene-vinyl acetate copolymers after saponification. The ethylene-vinyl acetate copolymer comprises ethylene and vinyl acetate monomers. After saponification of the ethylene-vinyl acetate copolymer, the vinyl acetate units can be chemically modified to vinyl alcohol units. Other monomer components can also be present in the saponified ethylene-vinyl acetate copolymer in such amounts not to impair the hydrophilicity of the hydrophilic membrane. The ethylene-vinyl alcohol copolymer can be of various types including, for example, random copolymers, block copolymers, graft copolymers, and the like, or combinations thereof. Similarly, the selection of ethylene-vinyl alcohol copolymer can depend on the structure and molecular weight of the ethylene-vinyl acetate copolymer formed prior to saponification.

In some embodiments, the degree of saponification of the ethylene-vinyl acetate copolymer can be at least about 40 mole percent based on the vinyl alcohol units in the copolymer. In other embodiments, the degree of saponification of the ethylene-vinyl acetate copolymer can be at least about 45 mole percent, at least about 65 mole percent, at least about 85 mole percent, or at least about 95 mole percent of the vinyl alcohol units in the copolymer. An insufficient degree of saponification may result in an insufficient increase in hydrophilic properties of the porous substrate for forming hydrophilic membranes.

Ethylene-vinyl alcohol copolymers can be selected to effectively coat the surfaces and pores of the porous substrate. The ratio of ethylene monomeric units to vinyl alcohol monomer units can influence, for example, the viscosity of the solution, the flowability of the solution, and the solubility of the copolymer in the solution. The content of the ethylene monomer units of the ethylene-vinyl alcohol copolymer can affect the adhesion of the ethylene-vinyl alcohol copolymer to the porous substrate. Generally, the content of the ethylene units of the copolymer is greater than about 5 mole percent. In some instances, copolymers having ethylene contents of less than 5 mole percent can have poor adhesion to the porous substrate. On the other hand, if the content of ethylene units is too high, the ethylene-vinyl alcohol copolymer can fail to impart good hydrophilicity when applied to a porous substrate. Typically, the content of the ethylene units of the ethylene-vinyl alcohol copolymer is less than 70 mole percent. In some embodiments, the ethylene unit content of the ethylene-vinyl alcohol copolymer is greater than about 10 mole percent. In some embodiments, the ethylene unit content of the ethylene-vinyl alcohol copolymer is greater than about 15 mole percent, is greater than about 20 mole percent, or is greater than about 25 mole percent. In some embodiments, the ethylene unit content of the ethylene-vinyl alcohol copolymer is less than about 60 mole percent, is less than about 50 mole percent, and is less than about 40 mole percent. In some embodiments, the ethylene unit content of the ethylene-vinyl alcohol copolymer is 17 mole percent. In another embodiment, the ethylene unit content of the ethylene-vinyl alcohol copolymer is 19 mole percent. In another embodiment, the ethylene content of the ethylene-vinyl copolymer is 22 mole percent. In some embodiments, the ethylene unit content of the ethylene-vinyl alcohol copolymer can be in a range of greater than about 5 mole percent to less than 70 mole percent. In some embodiments, the ethylene content of the ethylene unit content of the ethylene-vinyl alcohol copolymer is in a range of about 10 to about 50 mole percent, in a range of about 15 to about 50 mole percent, or in a range of about 20 mole percent to about 40 mole percent.

In the method of the present disclosure, a solution comprises water, a first solvent, and an ethylene-vinyl alcohol copolymer. The ethylene-vinyl alcohol copolymer can be dissolved in solution at elevated temperatures. The first solvent is miscible with water, and has a boiling point less than water (boiling point=100° C.). The first solvent and water form a single phase in the solution.

Water of the solution disclosed can include tap water, deionized water, distilled water, and the like, or combinations thereof. Ethylene-vinyl alcohol copolymers are generally insoluble in water, but soluble in the first solvent/water mixtures. A first solvent/water mixture can dissolve the ethylene-vinyl alcohol copolymer of the solution at elevated temperatures. In some embodiments, the ethylene-vinyl alcohol copolymer can dissolve in the first solvent-water forming a clear solution generally at elevated temperatures. In other embodiments, at least a portion of the ethylene-vinyl alcohol copolymer can be suspended in the first solvent-water phase forming a slightly turbid solution when the solution has been cooled from an elevated temperature to room temperature.

Suitable first solvents for the solution include organic solvents miscible with water and having a boiling point less than water. Suitable examples of first solvents include, for example, alcohols, esters, ethers, ketones, or combinations thereof. Water miscible organic solvents include, for example, alcohols, polyhydric alcohols, and the like, or combinations thereof. Some examples of alcohols include, for example, methanol, ethanol, n-propanol, isopropanol, sec-butanol, tert-butanol, and the like, or combinations thereof. Some examples of polyhydric alcohols include, for example, propylene glycerol. Other suitable first solvents include, for example, acetone, tetrahydrofuran, and the like.

In some embodiments, a second solvent not miscible with water can be miscible with the mixture of a first solvent and water. The second solvent can have a boiling point less than the boiling point of water. In some embodiments, the second solvent has a boiling point less than the boiling point of water.

In one embodiment, the first solvent is ethanol. In another embodiment, the first solvent is isopropanol.

In some embodiments, the first solvent is a mixture of two or more solvents. In one embodiment, the first solvent is a mixture of ethanol and isopropanol. In one embodiment, the first solvent is a mixture of isopropanol and methanol.

The miscibility of the first solvent and water in the solution can be used to effectively coat the porous substrate with the ethylene-vinyl alcohol copolymer as a thin coating. The ethylene units of the ethylene-vinyl alcohol copolymer are nonpolar and hydrophobic, and the vinyl alcohol units are polar and hydrophilic. When the ethylene-vinyl alcohol copolymer is dissolved in the solution, and applied to the porous substrate, it is desirable for the nonpolar ethylene units to be localized on the surface of the porous substrate (e.g., nonpolar substrate). The hydroxyl groups of the ethylene-vinyl alcohol copolymer can orient to the ethylene-vinyl alcohol coating surface opposite the substrate-coating interface. The orientation of the units of the ethylene-vinyl alcohol copolymer on the porous substrate can provide for improved adhesion of the thin layer to the surface of the substrate. The hydrophilicity of the coating layer on the surface of the porous substrate can be altered. The proportion of water to first solvent in the solution can vary depending on the concentration of the ethylene-vinyl alcohol copolymer in the solution, the content of ethylene units of the copolymer, the temperature for which the copolymer is applied to the substrate, and other factors.

In some embodiments, the concentration of the first solvent of the solution is at least 20 volume percent, at least 25 volume percent, at least 30 volume percent, or at least 35 volume percent based on the total volume of the first solvent and water. In other embodiments, the concentration of the first solvent of the solution is no greater than 95 volume percent, no greater than 70 volume percent, no greater than 60 volume percent, or no greater than 50 volume percent. In some embodiments, the concentration of the first solvent of the solution is in a range of about 20 to about 95 volume percent, in a range of about 25 to about 70 volume percent, in a range of about 30 to about 60 volume percent, or in a range of about 35 to about 50 volume percent.

In some embodiments, the concentration of water of the solution is at least 5 volume percent, at least 10 volume percent, at least 15 volume percent, or at least 20 volume percent based on the total volume of the water and the first solvent. In other embodiments, the concentration of water of the solution is no greater than 80 volume percent, no greater than 75 volume percent, no greater than 70 volume percent, or no greater than 65 volume percent. In some embodiments, the concentration of water of the solution is in a range of about 5 to about 80 volume percent, in a range of about 10 to about 75 volume percent, in a range of about 15 to about 70 volume percent, or in a range of about 20 to about 65 volume percent.

The concentration of the ethylene-vinyl alcohol copolymer of the solution can be formulated such that the solution has an appropriate viscosity to sufficiently coat the porous substrate. The dimensions of the pores of the substrate and the porous substrate can be considered when applying a solution in a single step or in multiple steps. In some embodiments, the concentration of the ethylene-vinyl alcohol copolymer in the solution comprising a first solvent and water is in a range of about 0.5 to about 30 weight percent. In some embodiments, the concentration of the ethylene-vinyl alcohol copolymer can be in a range of about 1 to about 20 weight percent, in a range of about 1.5 to about 25 weight percent, or in a range of about 2 to about 10 weight percent.

The concentration of the ethylene-vinyl alcohol copolymer of the solution can be selected such that the applied ethylene-vinyl alcohol copolymer doesn't substantially reduce the pore diameter of the pores or reduce the performance of the hydrophilic membrane.

In some embodiments, some or substantially most of the first solvent can be removed from the porous substrate. As the first solvent is removed from the porous membrane, the ethylene-vinyl alcohol copolymer can coat at least a portion of the surface and the pores of the porous substrate. The term "removing at least a portion of" refers to removing at least a portion of the first solvent, or substantially a majority of the first solvent from the porous substrate. In some embodiments, at least 50 weight percent of the first solvent can be removed. In another embodiment, at least 60 weight percent, at least 70 weight percent, at least 80 weight percent, or at least 90 weight percent of the first solvent can be removed from the porous substrate. In some embodiments, a portion of water can be removed from the porous substrate at temperatures no greater than 50° C.

In some embodiments, at least a portion of the first solvent can be removed from the porous substrate at a temperature no greater than 50° C. In another embodiment, at least a portion of the first solvent can be removed from the porous substrate at a temperature no greater than 40° C. In another embodiment, at least a portion of the first solvent can be removed from the porous substrate at a temperature no greater than 30° C.

The first solvent of the solution applied to the porous substrate can be removed by different techniques. Some suitable removal techniques for removing the first solvent include, for example, convection, reduced pressure, high pressure, heating, and the like, or other known techniques.

In the method of the present disclosure, a hydrophilic membrane is provided. The hydrophilic membrane can be formed from the method as described above. The hydrophilic membrane comprises a durable ethylene-vinyl alcohol copolymer coated on the surfaces and within the pores of the porous substrate. The ethylene-vinyl alcohol copolymer coating is generally not water soluble, but rather water swellable and useful in aqueous solution filtration. The hydrophilic membranes have increased surface energy when the first solvent is removed at temperatures no greater than 50° C. At temperatures greater than 50° C., the surface energy of the hydrophilic membrane can be reduced.

The hydrophilic membranes formed can have increase surface energy and wettability. In one embodiment, the hydrophilic membrane has a surface energy greater than 55 dynes/cm. In another embodiment, the hydrophilic membrane has a surface energy greater than 60 dynes/cm, greater than 65 dynes/cm, or greater than 70 dynes/cm.

Hydrophilic membranes of the present disclosure can be used in any of a variety of applications including, for example, use in liquid-liquid extraction and water-conditioning. Hydrophilic membranes can also be used in pharmaceutical, biotechnology, food, electronic, and medical applications.

The disclosure will be further clarified by the following examples which are exemplary and not intended to limit the scope of the disclosure.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.
Test Procedures
Surface Energy Measurements Dyne Test Solutions (30-70 dynes/cm) were available from Jemmco, LLC, Mequon, Wis., and a 73-79 dynes/cm test solution (formulated per Handbook of Chemistry and Physics (CRC), 71$^{st}$ edition, CRC press) was prepared. The dyne test solutions were available for surface energy measurements. The dyne solution was dropped onto one side of the membrane which was positioned on top of an illuminator. The illuminator was used to increase the ease of detecting the dyne solution penetration through the membrane. The drop volume of the dyne solution was about 0.5 milliliters (ml). The time required for the dyne solution to penetrate through the membrane was recorded with a stopwatch. The maximum surface tension of the membrane was recorded at the point where the dyne solution penetrated the membrane in a time of less than 1 second. The dyne solution capable of penetrating the membrane in less than 1 second was recorded as the surface energy of the membrane.

The surface energy of the thermal induced phase separation polypropylene membrane as described in U.S. Pat. No. 4,539,256 (Shipman) and U.S. Pat. No. 4,726,989 (Mrozinski) as measured by the procedure describe above was 37 dynes/cm.
Water Flow Rate Measurements Water flow measurements were made on membranes tested in a Gelman magnetic holder (East Hills, N.Y.) having a diameter of 34 mm, and a transmembrane pressure of 23 inches mercury (Hg) using a vacuum pump. The water flow rates (L/m$^2$·h·psi) were determined from the length of time required for 100 ml of distilled water to pass through the membrane.
Bubble Point Pore Size Measurements Bubble point pore size measurements were conducted in accordance with ASTM-F316-70. The membrane (mounted on a testing holder) was prewet with isopropanol. Nitrogen (g) was applied to the membrane with incremental increases in pressure to reach 100 percent gas flow through the membrane. The pressure required to achieve 100 percent gas flow through the membrane was recorded. The bubble point pore size was calculated from the pressure measurement.

Example 1

A coating solution was prepared. Ethylene-vinyl alcohol (EVAL) copolymer (EVAL 27; Sigma Aldrich, St. Louis, Mo.) having an ethylene content of 27 mole % was dissolved in an ethanol (AAPER Alcohol and Chemical Company; Shelbyville, Ky.)/water (60:40 volume:volume percent) mixture in a vessel. The contents of the vessel were stirred. The vessel was placed in a water bath at a temperature of about 80° C.-100° C. for forming a clear solution. The concentration of the EVAL in the solution is 2.5 weight percent.

A microporous polypropylene (PP) membrane formed by thermal induced phase separation (TIPS) process as described in U.S. Pat. Nos. 4,539,256 (Shipman) and 4,726,989 (Mrozinski) was used. The microporous polypropylene membrane was placed in a polyethylene (PE) bag. One end of the PE bag was sealed, and the other end of the bag was open. The coating solution was added to the open end of the PE bag coating the microporous polypropylene membrane, and the other end of the PE bag was sealed. After the microporous polypropylene membrane was saturated (e.g., soaked) with the coating solution, the surface of the PE bag was rubbed under gentle pressure with a paper towel to squeeze off the excess coating solution present on the membrane. After removing the excess coating solution from the microporous polypropylene membraned, the sealed PE bag was opened. The microporous polypropylene membrane was removed from the PE bag. The saturated microporous polypropylene membrane was exposed to air at about 23° C. for about 12 hours for the ethanol and water to evaporate to provide for an instantly wettable hydrophilic membrane in water. Dyne solution penetration testing showed 1-2 seconds for a 77 dyne solution and less than 1 second for a 76 dyne solution. Therefore, the surface energy of the EVAL coated hydrophilic membrane is about 76 dynes/cm.

Example 2

A coating solution was prepared. Ethylene-vinyl alcohol (EVAL) copolymer (EVAL 27; Sigma Aldrich, St. Louis, Mo.) having an ethylene content of 27 mole % was dissolved in an isopropanol (Alfa-Aesar; Ward Hill, Mass.)/water (70:30 volume:volume percent) mixture in a vessel. The contents of the vessel were stirred. The vessel was placed in a water bath at a temperature of about 80° C.-100° C. for forming a clear solution. The concentration of the EVAL in the solution is 2.5 weight percent.

A microporous polypropylene (PP) membrane as used in Example 1 was saturated with the coating solution as described above for this example. The microporous polypropylene membrane was processed as described in Example 1. The surface energy of the EVAL coated hydrophilic membrane is about 46 dynes/cm. The membrane was not wettable in water.

Examples 3-5

A coating solution was prepared. Ethylene-vinyl alcohol (EVAL) copolymer (EVAL 27; Sigma Aldrich, St. Louis, Mo.) having an ethylene content of 27 mole % was dissolved in an ethanol (AAPER Alcohol and Chemical Company; Shelbyville, Ky.)/water (70:30 volume:volume percent) mixture in a vessel. The contents of the vessel were stirred. The vessel was placed in a water bath at a temperature of about 80° C.-100° C. for forming a clear solution. The concentration of the EVAL in the solution is 0.5 weight percent. The temperature of the coating solution was maintained at 50° C. prior to coating the microporous polypropylene membrane.

Microporous polypropylene (PP) membranes as used in Example 1 were saturated with the coating solution as described above for this example. The microporous polypropylene membranes were similarly processed as described in Example 1, except that the membranes were dried at 50° C. in a speed dryer (Emerson Speed Dryer model 130; Emerson Company; Gorham, Me.). The drying times of the hydrophilic membranes (i.e., 3, 4 and 5) were 1 minute, 5 minutes, and 30 minutes, respectively. Hydrophilic membranes of Examples 3, 4 and 5 were not wettable. The surface energy of Example 3 was 36 dynes/cm, Example 4 was 36 dynes/cm, and Example 5 was 37 dynes/cm.

Examples 6-9

A coating solution was prepared. Ethylene-vinyl alcohol (EVAL) copolymer (EVAL 38; Sigma Aldrich, St. Louis, Mo.) having an ethylene content of 38 mole % was dissolved in an ethanol (AAPER Alcohol and Chemical Company; Shelbyville, Ky.)/water (70:30 volume:volume percent) mixture in a vessel. The contents of the vessel were stirred. The vessel was placed in a water bath at a temperature of about 80° C.-100° C. for forming a clear solution. The concentration of the EVAL38 in the solution is 0.5 weight percent. The temperature of the coating solution was maintained at 50° C. prior to coating the microporous polypropylene membrane for Examples 6-7.

Microporous polypropylene (PP) membranes were prepared as described in Example 1 were immersed (e.g., soaked) in the EVAL solution prepared for Examples 6-7 and Examples 8-9s for 10 min similar to the procedure of Example 1 before taking out of the PE bag. Excess coating solution applied to the microporous polypropylene membranes of Examples 6-8 were removed by compressing the membranes between paper towels. The microporous hydrophilic membranes of Examples 6 and 8 were dried in a Speed Dryer (Emerson Speed Dryer Model 130, Emerson Company; Gorham, Me.) at 50° C. for two hours. The microporous hydrophilic membranes of Examples 7 and 9 were dried at ambient conditions at room temperature for 48 hours with a paper towel placed on the top. Dyne solution penetration times and surface energies of the hydrophilic membranes of Examples 6-8 are shown in Table 1.

TABLE 1

| Example | EVAL Copolymer | Drying Temperature (° C.) | Drying Time (hours) | Surface Energy (dynes/cm) |
|---|---|---|---|---|
| 6 | EVAL 38 | 50° C. | 2 | 38 |
| 7 | EVAL 38 | 23° C. | 48 | 44 |
| 8 | EVAL 44 | 50° C. | 2 | 40 |
| 9 | EVAL 44 | 23° C. | 48 | 45 |

Examples 10-17

A coating solution was prepared. Ethylene-vinyl alcohol (EVAL) copolymer (EVAL 27; Sigma Aldrich, St. Louis, Mo.) having an ethylene content of 27 mole % was dissolved in an ethanol (AAPER Alcohol and Chemical Company; Shelbyville, Ky.)/water (70:30 volume:volume percent) mixture in a vessel. The contents of the vessel were stirred. The vessel was placed in a water bath at a temperature of about 80° C.-100° C. for forming a clear solution. The concentration of the EVAL 27 in the solutions is 1.0, 12.0, 2.5 and 3.0 weight percent as noted in Table 2. The temperature of the coating solution was maintained at 50° C. prior to coating the microporous polypropylene membrane for Examples 10-17.

A polypropylene TIPS membrane (formed by the TIPS process described in Example 1) was placed in a PE bag and sealed at one end. The EVAL 27 solutions were added to the open end of the PE bag. And the open end was sealed. The polypropylene TIPS membranes were immersed in the EVAL 27 solutions for 10 minutes before removing from the solution. The solution on the surface of the membranes was removed by compressing the membranes between two paper towels. Thereafter, membranes were dried either in a Speed Dryer (Emerson Speed Dryer Model 130; Emerson Company; Gorham, Me.) at 50° C. for two hours, or by air exposure under ambient conditions for 48 hours with paper towel coverage on the top. The penetration times of dyne solutions on these membranes and membrane surface energy measurements are listed in Table 2.

TABLE 2

| Example | EVAL 27 Concentration (weight %) | Drying Temperature (° C.) | Drying Time (hours) | Surface Energy (dynes/cm) |
|---|---|---|---|---|
| 10 | 1.0 | 50° C. | 2 | 37 |
| 11 | 2.0 | 50° C. | 2 | 37 |
| 12 | 2.5 | 50° C. | 2 | 37 |
| 13 | 3.0 | 50° C. | 2 | 38 |
| 14 | 1.0 | 23° C. | 48 | 54 |
| 15 | 2.0 | 23° C. | 48 | 72 |
| 16 | 2.5 | 23° C. | 48 | 72 |
| 17 | 3.0 | 23° C. | 48 | 74 |

Examples 18-27

A coating solution was prepared. Ethylene-vinyl alcohol (EVAL) copolymer (EVAL 27; Sigma Aldrich, St. Louis, Mo.) having an ethylene content of 27 mole % was dissolved in an isopropanol (Alfa-Aesar; Ward Hill, Mass.)/water (80:20; 70:30; 60:40; 50:50, and 40:60 volume:volume percent) mixture in a vessel. The contents of the vessel were stirred. The vessel was placed in a water bath at a temperature of about 80° C.-100° C. for forming a clear solution. The concentration of the EVAL27 in the solution was 2.5 and 5.0 weight percent as described in Table 3. The coating solutions were cooled to about 23° C. before coating the microporous polypropylene membranes for Examples 18-27.

Microporous polypropylene (PP) membranes were prepared as described in Example 1 were immersed (e.g., soaked) in the EVAL 27 solution prepared for Examples 18-27 for 10 min similar to the procedure of Example 1 before taking out of the PE bag. Excess coating solution applied to the microporous polypropylene membranes of Examples 18-27 was removed by compressing the membranes between paper towels. The microporous hydrophilic membranes of Examples 18-27 were dried at ambient conditions at about 23° C. for 48 hours with a paper towel placed on the top. Dyne solution penetration times and surface energies of the hydrophilic membranes of Examples 18-27 are shown in Table 3.

TABLE 3

| Example | Isopropanol/Water Ratio (vol.:vol. %) | EVAL 27 Concentration (weight %) | Bubble Point Pore Size (μm) | Surface Energy (dynes/cm) |
|---|---|---|---|---|
| 18 | 80:20 | 2.5 | 0.84 | 39 |
| 19 | 80:20 | 5.0 | 0.87 | 44 |
| 20 | 70:30 | 2.5 | 0.87 | 44 |
| 21 | 70:30 | 5.0 | 0.85 | 49 |
| 22 | 60:40 | 2.5 | 0.79 | 46 |
| 23 | 60:40 | 5.0 | 0.80 | 52 |
| 24 | 50:50 | 2.5 | 0.78 | 46 |
| 25 | 50:50 | 5.0 | 0.84 | 54 |
| 26 | 40:60 | 2.5 | 0.87 | 52 |
| 27 | 40:60 | 5.0 | 0.85 | 62 |

Example 28-30

A coating solution was prepared. Ethylene-vinyl alcohol (EVAL) copolymer (EVAL 44; Sigma Aldrich, St. Louis, Mo.) having an ethylene content of 44 mole % was dissolved in various solvents (Alfa-Aesar; Ward Hill, Mass.)/water (80:20; 70:30; volume:volume percent) mixtures in a vessel. The contents of the vessel were stirred. The vessel was placed in a water bath at a temperature of about 80° C.-100° C. for forming a clear solution. The concentration of the EVAL 44 in the solution was 2.5 weight percent as described in Table 4. The coating solutions were cooled to about 23° C. before coating the microporous polypropylene membranes for Examples 28-30.

Microporous polypropylene (PP) membranes were prepared as described in Example 1 were immersed (e.g., soaked) in the EVAL 44 solution prepared for Examples 27-30 for 10 min similar to the procedure of Example 1 before taking out of the PE bag. Excess coating solution applied to the microporous polypropylene membranes of Examples 27-30 were removed by compressing the membranes between paper towels. The microporous hydrophilic membranes of Examples 27-30 were dried at ambient conditions at about 23° C. for 48 hours with a paper towel placed on the top. Dyne solution penetration times and surface energies of the hydrophilic membranes of Examples 27-30 are shown in Table 4.

TABLE 4

| Example | Solvent/Water Ratio (vol.:vol. %) | EVAL 44 Concentration (weight %) | Bubble Point Pore Size (μm) | Surface Energy (dynes/cm) |
|---|---|---|---|---|
| 28 | Isopropanol/H2O (70:30) | 2.5 | 0.87 | 40 |
| 29 | Isopropanol/Ethanol/H2O (35:35:30) | 5.0 | 0.85 | 46 |
| 30 | Isopropanol/Methanol/H2O (35:35:30) | 2.5 | 0.83 | 55 |

Examples 31-36

A coating solution was prepared. Ethylene-vinyl alcohol (EVAL) copolymer (EVAL 38 or EVAL 44; Sigma Aldrich, St. Louis, Mo.) having an ethylene content of 38 mole % or 44 mole %, respectively, was dissolved in isopropanol (Alfa-Aesar; Ward Hill, Mass.)/water (differing volume:volume percents) mixtures in a vessel. The contents of the vessel were stirred. The vessel was placed in a water bath at a temperature of about 80° C.-100° C. for forming a clear solution. The concentration of the EVAL 38 or the EVAL 44 in the solution was 20 weight percent. After EVAL was dissolved, the solution was diluted to 2.5 weight percent in isopropanol. The temperature of the coating solution was maintained at 50° C. prior to coating the microporous polypropylene membrane for Examples 31-36.

Microporous polypropylene (PP) membranes were prepared as described in Example 1 were immersed (e.g., soaked) in the EVAL 38 or EVAL 44 solution prepared for Examples 27-30 for 10 min similar to the procedure of Example 1 before taking out of the PE bag. Excess coating solution applied to the microporous polypropylene membranes of Examples 31-36 were removed by compressing the membranes between paper towels. The microporous hydrophilic membranes of Examples 31-36 were dried at ambient conditions at about 23° C. for 48 hours with a paper towel placed on the top. Dyne solution penetration times and surface energies of the hydrophilic membranes of Examples 31-36 are shown in Table 5.

TABLE 5

| Example | Solvent/Water Ratio (vol.:vol. %) | EVAL Copolymer | Dilution Solvent | Bubble Point Pore Size (μm) | Surface Energy (dynes/cm) |
|---|---|---|---|---|---|
| 31 | Isopropanol/H2O (75:25) | EVAL 38 | MeOH/H2O (70:30) | 0.86 | 62 |
| 32 | Isopropanol/H2O (75:25) | EVAL 38 | MeOH/H2O (80:20) | 0.81 | 62 |

TABLE 5-continued

| Example | Solvent/Water Ratio (vol.:vol. %) | EVAL Copolymer | Dilution Solvent | Bubble Point Pore Size (μm) | Surface Energy (dynes/cm) |
|---|---|---|---|---|---|
| 33 | Isopropanol/H2O (75:25) | EVAL 38 | EtOH/H2O (60:40) | 0.90 | 57 |
| 34 | Isopropanol/H2O (70:30) | EVAL 44 | MeOH/H2O (80:20) | 0.90 | 57 |
| 35 | Isopropanol/H2O (70:30) | EVAL 44 | EtOH/H2O (70:30) | 0.83 | 54 |
| 36 | Isopropanol/H2O (70:30) | EVAL 44 | EtOH/H2O (60:40) | 0.78 | 49 |

Various modifications and alterations of this disclosure will be apparent to those skilled in the art without departing from the scope and spirit of this disclosure, and it should be understood that this disclosure is not limited to the illustrative elements set forth herein.

What is claimed is:

1. A method of forming a hydrophilic membrane comprising:
    providing a hydrophobic porous substrate, wherein the porous substrate comprises polypropylene;
    applying a solution to the hydrophobic porous substrate, the solution consisting essentially of
    i) an ethylene-vinyl alcohol copolymer;
    ii) water; and
    iii) a first solvent, the first solvent miscible with water and having a boiling point less than the boiling point of water, wherein the first solvent comprises alcohols selected from methanol, ethanol, isopropanol n-propanol, or combinations thereof; and
    removing at least a portion of the first solvent from the porous substrate at a temperature no greater than 40° C. to provide the hydrophilic membrane, wherein the hydrophilic membrane has a surface energy greater than 60 dynes/centimeter.

2. The method of claim 1, wherein the porous substrate comprises a microporous, thermally-induced phase separation membrane.

3. The method of claim 1, wherein the porous substrate comprises a film, a nonwoven web, a woven web, a hollow fiber or combinations thereof.

4. The method of claim 1, wherein the porous substrate further comprises polyolefins, polyamides, fluorinated polymers, poly(ether)sulfones, cellulosics, poly(ether)imides, polyacrylonitriles, polyvinylchlorides, ceramics, or combinations thereof.

5. The method of claim 1, wherein the porous substrate further comprises polyolefins.

6. The method of claim 5, wherein the polyolefins comprise polyethylene.

7. The method of claim 5, wherein the porous substrate comprises polyamides.

8. The method of claim 7, wherein the polyamides comprise nylon 6,6.

9. The method of claim 1, wherein the applying comprises die coating, roll coating, dip coating, spray coating, curtain coating, slide coating or combinations thereof.

10. The method of claim 1, wherein the ethylene-vinyl alcohol copolymer has a concentration of 1 to 20 weight percent in the solution.

11. The method of claim 1, wherein the ethylene-vinyl alcohol copolymer has a concentration of 2 to 10 weight percent in the solution.

12. The method of claim 1, wherein the ethylene-vinyl alcohol copolymer comprises an ethylene content in a range from 10 to 50 mole percent.

13. The method of claim 1, wherein the volume percent of water of the solution is in a range of 5 to 80 volume percent based on the total volume of the first solvent and water.

14. The method of claim 1, wherein the volume percent of the first solvent of the solution is in a range of 20 to 95 volume percent based on the total volume of the first solvent and water.

15. The method of claim 1, wherein the removing comprises convection, reduced pressure, heating, or combinations thereof.

16. The method of claim 1, wherein the hydrophilic membrane has a surface energy greater than 65 dynes/centimeter.

17. A hydrophilic membrane formed by the method of claim 1.

18. The method of claim 1, wherein the temperature is no greater than 30° C.

* * * * *